Feb. 5, 1963

R. A. BUB 3,076,554

FILTER COIL

Filed Aug. 3, 1960

INVENTOR.
ROBERT A. BUB

BY

HIS ATTORNEYS

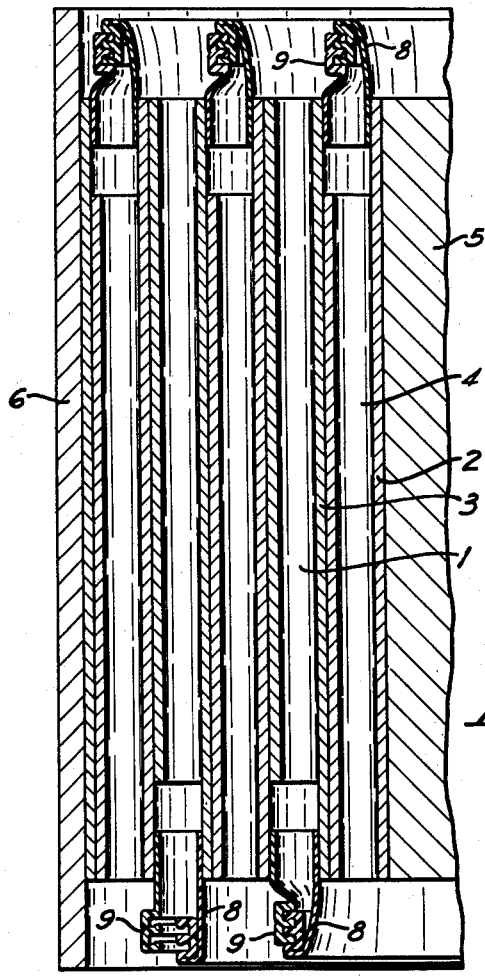
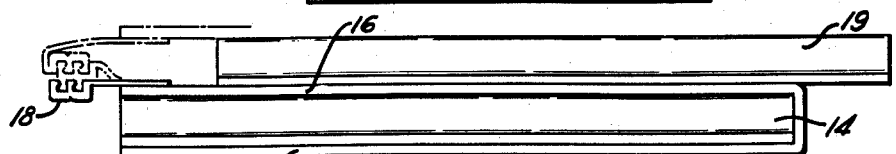
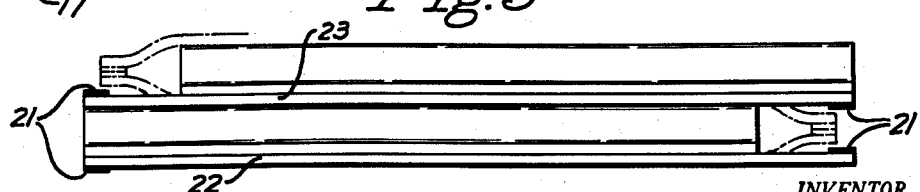

United States Patent Office 3,076,554
Patented Feb. 5, 1963

3,076,554
FILTER COIL
Robert A. Bub, Penn Hills, Pa., assignor to Mine Safety
Appliances Company, a corporation of Pennsylvania
Filed Aug. 3, 1960, Ser. No. 47,287
3 Claims. (Cl. 210—487)

This invention relates to filters, and more particularly to those made by rolling filtering material into a coil, the axis of which extends lengthwise of the fluid stream being filtered.

It is among the objects of this invention to provide a filter coil which is easy to make and from which the filtering material can be removed for cleaning.

In accordance with this invention a pair of separator strips are disposed in spaced face-to-face relation and are formed into a coil. A pair of strips of filtering material extend lengthwise of the separator strips on opposite sides of one of them. The filtering strips are connected together across the adjacent edge of one separator strip at one end of the coil, and means, preferably a continuous separable fastener, extends along the edges of the filtering strips at the opposite end of the coil to connect them together across the adjacent edge of the other separator strip, whereby a continuous filter sheet is formed that is zigzag in radial section.

The invention is illustrated in the accompanying drawings, in which

FIG. 4 is a fragmentary longitudinal section taken on the line IV—IV of FIG. 3, but with the lower separable fastener still open; and FIGS. 5 and 6 are end views similar to FIG. 1 of two different modifications.

Figure 1:
FIG. 1 is an end view of two filtering strips and two separator strips, showing one way of performing one of the first steps in making the filter coil.
Figure 2:
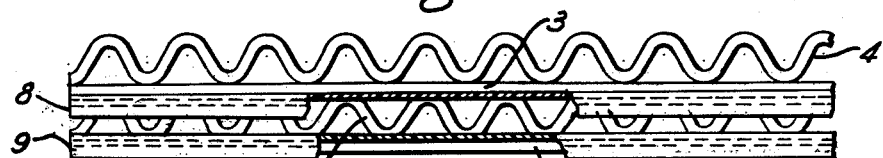
FIG. 2 is a fragmentary edge view, with parts broken away in section, showing the strips as viewed from the right in FIG. 1.
Figure 3:
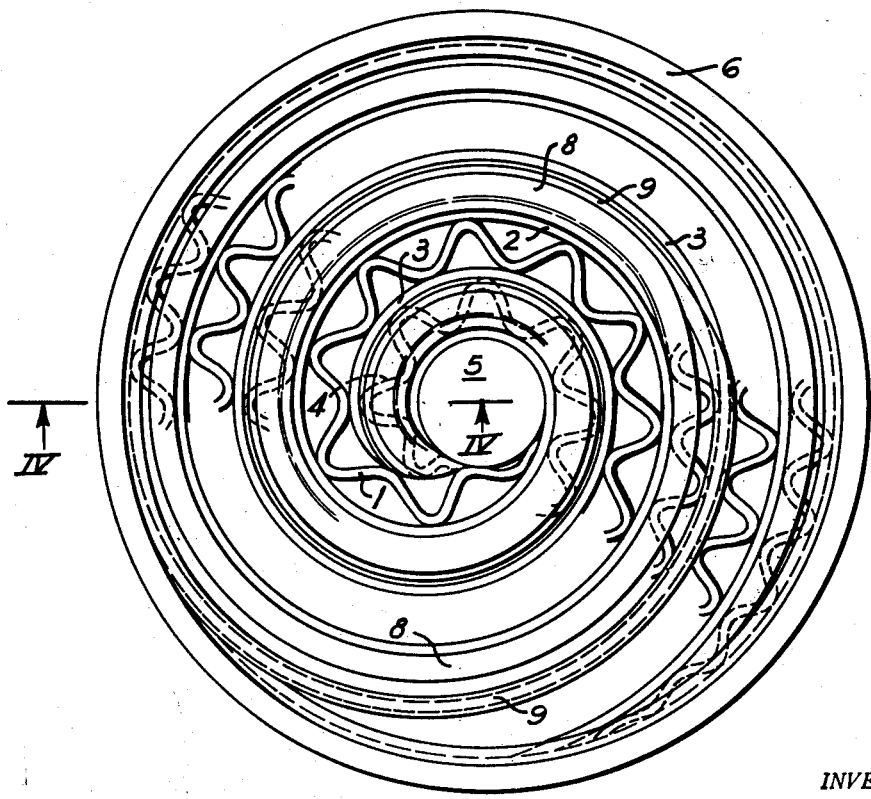
FIG. 3 is an end view of the coil with the filtering strips partly joined together by a separable fastener.

Referring to FIGS. 1 and 2 of the drawings, a separator strip 1 of suitable form, which may be a corrugated strip of metal, paperboard or the like, is laid along the top of a wider strip 2 of filtering material that projects from at least one edge of the separator strip. The length of the strips will depend on the diameter of the filter coil that is to be made from them. A second filtering strip 3 then is laid on top of the separator strip, and a second separator strip 4 is laid on the upper filtering strip. The strips are arranged so that if the filtering strips project from only one edge of each separator strip, they will project from one edge of one separator and from the opposite edge of the other separator. For ease of fabrication, the two separator strips have the same width, although this is not absolutely necessary. The assembly of strips formed in the manner just described is then rolled up into a coil like a jelly roll, as shown in FIG. 3. For best results, the strips are rolled around a central core member 5 to prevent any possibility of leaving a central passage through the coil. The separator strips space the filtering strips apart so that gas can flow through the filtering strips.

After the coil is completed, the edges of the filtering strips projecting beyond the intervening separator strips are secured together across the edges of the separators at both ends of the coil, with the result that the filtering material forms a continuous zigzag filter sheet extending from the outside of the roll to the core. To help hold the roll together and in generally cylindrical form, it may be encircled by a band or cylinder 6 or the like. The outer end of the outer strip may be secured to the adjoining portion of the coil, and the inner end of the inner strip may be joined to core 5. The coil can take other forms if desired, such as elliptical, triangular or square.

It is a feature of this invention that the connections between the edges of the filtering strips 2 and 3 are separable so that the coil can be unrolled and the filtering strips removed for cleaning and then replaced. This can be accomplished by attaching a conventional continuous separable fastener to the edges of the filtering strips. A Velcro fastener is very suitable, as well as the common type of slide fastener that has interengageable teeth. A simple and inexpensive fastener is the kind, also well known, that is formed from two narrow plastic ribbons 8 and 9, one of which is formed with beads 10 extending lengthwise of it and the other of which has longitudinally extending grooves 11, into which the beads can be snapped to connect the two ribbons as is shown at the top of the coil in FIG. 4. That can be done by pressing the beads into the grooves by the fingers as they are slid along the two ribbons, whereby the adjoining edges of the filtering strip will be sealed together.

Instead of using two entirely separate filtering strips 1 and 3 and joining their edges at both ends of the coil by two different fasteners, two strips can be formed from one double-width length of filtering material folded lengthwise around one separator strip 14 as shown in FIG. 5 to provide two filtering strips 15 and 16 integrally connected at one edge of the separator strip. In that case the two halves 17 and 18 of a separable fastener are secured to the free edges of the two strips. A second separator strip 19 is laid on strip 16, and after a coil is formed in the manner previously described, the strips are connected together across the adjacent edge of the second separator strip to form a continuous filter sheet that is zigzag in radial section. This system eliminates the handling of one independent filtering strip and one separable fastener.

Separable fasteners are especially advantageous with cloth filtering material, which is difficult to fasten by other means but is well suited to washing when dirty.

If it is not desired to be able to remove the filtering strips from the coil, and particularly if they are not made of cloth, they can be glued together by applying bands 21 of adhesive to the edges of the strips 22 and 23 as shown in FIG. 6 either before or after the coil is formed. The adjacent edges of the strips then are pressed together as indicated in dotted lines to join them permanently. Other forms of permanent fastening include heat sealing and the use of solvents for chemical reactions between the adjoining parts.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A filter coil comprising a pair of separator strips disposed in spaced face-to-face relation and formed into a coil, a pair of strips of filtering material extending lengthwise of the separator strips on opposite sides of one of them, the filtering strips being connected together across the adjacent edge of one separator strip at one end of the coil, and a continuous separable fastener extending along the edges of the filtering strips at the opposite end of the coil and connecting them together across the adjacent edge of the other separator strip, whereby to form a zigzag filter sheet in radial section.
2. A filter coil comprising a pair of separator strips disposed in spaced face-to-face relation and formed into a coil, a pair of strips of filtering material extending lengthwise of the separator strips on opposite sides of one of them, a continuous separable fastener at one end of the coil extending along the edges of the filtering strips and connecting them together across the adjacent edge of said one separator strip, and a like fastener at the opposite end of the coil connecting the edges of the filtering strips together across the adjacent edge of the other separator strip, whereby to form a zigzag filter sheet in radial section.

3. A filter coil comprising a pair of separator strips disposed in spaced face-to-face relation and formed into a coil, a pair of strips of filtering material extending lengthwise of the separator strips on opposite sides of one of them, the filtering strips being connected together across the adjacent edge of one separator strip at one end of the coil, and a pair of plastic ribbons extending along the edges of the filtering strips at the opposite end of the coil and projecting therefrom side by side, each of the ribbons being provided with a pair of uniformly spaced beads extending lengthwise thereof from end to end, each bead being thinner adjacent its base than at its outer edge, and the beads of each ribbon straddling a bead of the other ribbon in sealing engagement therewith to detachably connect the two ribbons together across the adjacent edge of the other separator strip, whereby to form a filter sheet that is zigzag in radial section.

References Cited in the file of this patent

UNITED STATES PATENTS

| | | |
|---|---|---|
| 1,872,430 | Ericson | Aug. 16, 1932 |
| 2,255,937 | McNamara | Sept. 16, 1941 |
| 2,564,637 | Chase | Aug. 14, 1951 |
| 2,574,251 | Dinley | Nov. 6, 1951 |
| 2,599,604 | Bauer | June 10, 1952 |

FOREIGN PATENTS

| | | |
|---|---|---|
| 535,153 | Great Britain | Nov. 19, 1940 |